United States Patent
Linz et al.

(10) Patent No.: US 12,463,495 B2
(45) Date of Patent: Nov. 4, 2025

(54) ELECTRIC MACHINE, METHOD FOR PRODUCING AN ELECTRIC MACHINE, AND ELECTRICALLY OPERABLE POWERTRAIN

(71) Applicant: Schaeffler Technologies AG & Co. KG, Herzogenaurach (DE)

(72) Inventors: Bernhard Linz, Wilhelmsdorf (DE); Robert Schieck, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 339 days.

(21) Appl. No.: 18/034,126

(22) PCT Filed: Oct. 8, 2021

(86) PCT No.: PCT/DE2021/100816
§ 371 (c)(1),
(2) Date: Apr. 27, 2023

(87) PCT Pub. No.: WO2022/089684
PCT Pub. Date: May 5, 2022

(65) Prior Publication Data
US 2023/0396118 A1 Dec. 7, 2023

(30) Foreign Application Priority Data
Oct. 28, 2020 (DE) .......................... 102020128343.1

(51) Int. Cl.
*H02K 5/16* (2006.01)
*F16C 19/06* (2006.01)
(Continued)

(52) U.S. Cl.
CPC .......... *H02K 5/1732* (2013.01); *F16C 19/06* (2013.01); *F16C 19/54* (2013.01); *F16C 25/083* (2013.01); *H02K 7/083* (2013.01); *F16C 2380/26* (2013.01)

(58) Field of Classification Search
CPC ...... H02K 5/1732; H02K 7/083; F16C 19/06; F16C 25/083; F16C 19/54; F16C 2380/26
See application file for complete search history.

(56) References Cited

U.S. PATENT DOCUMENTS

2006/0062505 A1   3/2006  Hoefs
2009/0091201 A1*  4/2009  Scherzinger ............ F16C 19/52
                                                       310/86

FOREIGN PATENT DOCUMENTS

DE    7807566 U1   9/1979
DE    3044732 A1   9/1981
(Continued)

Primary Examiner — Terrance L Kenerly
(74) Attorney, Agent, or Firm — Volpe Koenig

(57) ABSTRACT

An electric machine for use within the powertrain of a hybrid or fully electric motor vehicle including a stator and a rotor which is separated from the stator by an air gap, said stator and rotor being received in an engine housing. The rotor is rotatably mounted relative to the stator by means of two axially spaced rolling bearings, and at least one of the rolling bearings is axially biased by a spring element which is supported against the motor housing in the axial direction and lies against the rolling bearing. The biased rolling bearing has an inner ring and an outer ring, between which a plurality of rolling bodies are received in a rollable manner, the inner ring is rotationally fixed to the rotor via a first bearing seat, and the outer ring is rotationally fixed to the engine housing via a second bearing seat. The spring element is arranged on the first bearing seat and/or second bearing seat so as to be secured in the axial direction in a form-fitting manner.

14 Claims, 4 Drawing Sheets

(51) Int. Cl.
   *F16C 19/54*    (2006.01)
   *F16C 25/08*    (2006.01)
   *H02K 5/173*    (2006.01)
   *H02K 7/08*     (2006.01)

(56) References Cited

FOREIGN PATENT DOCUMENTS

| | | | |
|---|---|---|---|
| DE | 19804328 | A1 | 8/1999 |
| DE | 10324621 | A1 | 12/2004 |
| DE | 102011006281 | A1 | 10/2012 |
| DE | 102012220985 | B3 | 5/2014 |
| DE | 102018118069 | A1 | 1/2020 |
| EP | 1256732 | A1 | 11/2002 |
| EP | 3488971 | A1 | 5/2019 |
| JP | 2001065584 | A | 3/2001 |
| JP | 2003170835 | A | 6/2003 |

\* cited by examiner

ELECTRIC MACHINE, METHOD FOR PRODUCING AN ELECTRIC MACHINE, AND ELECTRICALLY OPERABLE POWERTRAIN

CROSS-REFERENCE TO RELATED APPLICATIONS

This application is the U.S. National Phase of PCT Appln. No. PCT/DE2021/100816, filed Oct. 8, 2021, which claims the benefit of German Patent Appln. No. 102020128343.1, filed Oct. 28, 2020, the entire disclosures of which are incorporated by reference herein.

TECHNICAL FIELD

The present disclosure relates to an electric machine, in particular for use within a powertrain of a hybrid or fully electrically driven motor vehicle. The disclosure also relates to a method for producing an electric machine and an electrically operable powertrain.

BACKGROUND

A rotor in an electric machine is usually mounted in the motor housing with a rolling bearing configured as a fixed bearing and a rolling bearing configured as a floating bearing. When individual bearing components are assembled, the outer ring, inner ring, rolling bodies and cage of the rolling bearing work together to provide a controlled clearance between the bearing rings and the rolling bodies. This radial play formed from this is necessary for the proper operation of the rolling bearing. However, in most applications it is also necessary to reduce this internal play to ensure the correct functioning of the rolling bearing.

For this purpose, an axial load can be applied to a bearing ring, which is usually effected by means of spring force. This is referred to as prestress and ensures constant contact between the rolling bodies and the bearing rings and reduces any play that may occur between components.

When assembling the motor housing with an inserted prestressing spring and the rotor, it can happen that the pre-assembled assemblies are positioned or moved into an overhead position. The prestressing spring used can become detached from the assembly in the housing during handling. In the assembly plant, it is practically impossible to check whether the prestressing spring is correctly positioned on a rolling bearing that is to be prestressed.

SUMMARY

It is therefore the object of the disclosure to provide an electric machine which is optimized in terms of its ease of assembly and assembly safety against incorrect assembly.

This object is achieved by an electric machine, in particular for use within a powertrain of a hybrid or fully electrically driven electric motor vehicle, comprising a stator and a rotor which is separated from the stator by an air gap, said stator and rotor being accommodated in a motor housing, wherein the rotor is rotatably mounted relative to the stator by means of two axially spaced rolling bearings and at least one of the rolling bearings is axially prestressed by a spring element, which is supported against the motor housing in the axial direction and lies against one of the rolling bearings, wherein the prestressed rolling bearing has an inner ring and an outer ring, between which a plurality of rolling bodies are accommodated in a rollable manner, and the inner ring is connected in a rotationally fixed manner to the rotor via a first bearing seat and the outer ring is connected in a rotationally fixed manner to the motor housing via a second bearing seat.

The form fit between the spring element and one of the bearing seats acting in the axial direction guarantees that the spring element cannot be unintentionally removed from a defined assembly position in the axial direction and thus ensures that the component always remains in a defined axial position relative to one of the bearing seats during the assembly process, so that, for example, an overhead assembly of components is possible.

First, the individual elements of the claimed subject matter of the disclosure are explained in the order in which they are named in the set of claims and particularly preferred embodiments of the subject matter of the disclosure are described below.

Electric machines are used to convert electrical energy into mechanical energy and/or vice versa, and generally comprise a stationary part referred to as a stator, stand, or armature, and a part referred to as a rotor or runner, and arranged movably relative to the stationary part.

The electric machine can be configured in particular as a radial flux machine or an axial flux machine. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The electric machine according to the disclosure is designed in particular as a radial flux machine in an internal rotor configuration. The electric machine is also intended in particular for use within a powertrain of a hybrid or fully electrically driven electric motor vehicle. In particular, the electric machine is dimensioned in such a way that vehicle speeds of more than 50 km/h, preferably more than 80 km/h and in particular more than 100 km/h can be achieved. The electric motor particularly preferably has an output of more than 30 kW, preferably more than 50 kW and in particular more than 70 kW. Furthermore, it is preferred that the electric machine provides speeds greater than 5,000 rpm, particularly preferably greater than 10,000 rpm, very particularly preferably greater than 12,500 rpm.

The motor housing encloses the electric machine. A motor housing can furthermore accommodate the control and power electronics. The motor housing can furthermore be part of a cooling system for the electric machine, and can be designed in such a way that cooling fluid can be supplied to the electric machine via the motor housing and/or the heat can be dissipated to the outside via the housing surfaces. In addition, the motor housing protects the electric machine and any electronics that might be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic.

In particular, the motor housing can also have end shields. End shields are the rear and front covers of the machine housing, which protect the inside of the electric machine against contact, for example, and accommodate the bearings of the shaft ends of the rotor. The A end shield refers to the output side and usually carries a fixed bearing, the B end shield is the fan side and is supported by a sliding fit in order to be able to compensate for thermal expansion of the rotor.

Preferably, the stator of a radial flux machine is constructed cylindrically and consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses can be embedded into the electrical lamination running parallel to the rotor shaft, and can accommodate the stator winding or parts of the stator winding. Depending on the construction towards the surface, the grooves can be closed with closing elements, such as closing wedges or covers or the like, to prevent the stator winding from detaching.

A rotor is the rotating (spinning) part of an electric machine. The rotor can comprise a rotor shaft and one or more rotor bodies arranged on the rotor shaft in a non-rotatable manner. The rotor shaft can be designed to be hollow, which on the one hand saves weight and on the other hand allows lubricant or coolant to be supplied to the rotor body.

A rotor body in the context of the disclosure is understood to mean the rotor without a rotor shaft. The rotor body is therefore composed in particular of the laminated rotor core and the magnetic elements introduced into the pockets of the laminated rotor core or fixed circumferentially to the laminated rotor core and any axial cover parts present for closing the pockets, and the like.

Rolling bearings can be used in particular to enable rotary movements with the lowest possible frictional losses. Rolling bearings can be used in particular to affix and/or mount axles and shafts, wherein they, depending on the design, absorb radial and/or axial forces and simultaneously enable the rotation of the shaft or the components mounted on an axle in this way.

For this purpose, rolling bodies are arranged so as to roll between an inner ring and an outer ring of the rolling bearing. Between these three main components—inner ring, outer ring and the rolling bodies—it is usually mainly rolling friction that occurs within the rolling bearing. Since the rolling bodies in the inner and outer ring can preferably roll on hardened steel surfaces with optimized lubrication, the rolling friction of such bearings is relatively low. A rolling bearing can be of single-row or multi-row design.

The inner ring can in particular connect the shaft accommodating the rolling bearings to the rolling bearing or the rolling bodies. In particular, the shaft can be connected to the side of the lateral surface of the inner ring facing the shaft, wherein the rolling bodies of the rolling bearing roll on the inner ring raceway opposite this lateral surface.

The inner ring can be made of a metallic and/or ceramic material. In principle, it is conceivable to design the inner ring in one piece or in multiple pieces, in particular in two pieces.

The rolling bodies can roll within the rolling bearing, in particular on the inner ring raceway of the inner ring. For this purpose, the surface of the inner ring raceway can advantageously be designed to be abrasion-resistant, for example by means of a corresponding surface treatment method and/or by applying a corresponding additional layer of material.

The inner ring raceway can be designed to be planar or profiled. A profiled design of the inner ring raceway can be used, for example, to guide the rolling bodies on the inner ring raceway. On the other hand, a planar formation of the inner ring raceway can, for example, allow a certain axial displaceability of the rolling bodies on the inner ring raceway.

The inner ring raceway can have a profile for accommodating and/or guiding rolling bodies. As a result, the rolling bodies are guided, for example, in a defined manner in or on the inner ring raceway. Furthermore, the axial and radial force absorption of the rolling bearing can be influenced by the geometric design of the profiled inner ring raceway.

The outer ring can, in particular, connect the bearing arrangement accommodating the rolling bearings to the rolling bearing or the rolling bodies. In particular, the bearing arrangement can be connected to the side of the lateral surface of the outer ring facing the bearing arrangement, wherein the rolling bodies of the rolling bearing roll on the outer ring raceway opposite this lateral surface.

The outer ring can be made of a metallic and/or ceramic material. In principle, it is conceivable to design the outer ring in one piece or in multiple pieces, in particular in two pieces.

The rolling bodies can roll within the rolling bearing, in particular on the outer ring raceway of the outer ring. For this purpose, the surface of the outer ring raceway can advantageously be designed to be abrasion-resistant, for example by means of a corresponding surface treatment method and/or by applying a corresponding additional layer of material.

The outer ring raceway can be designed to be planar or profiled. A profiled design of the outer ring raceway can be used, for example, to guide the rolling bodies on the outer ring raceway. On the other hand, a planar formation of the outer ring raceway can, for example, allow a certain axial displaceability of the rolling bodies on the outer ring raceway.

The outer ring raceway can have a profile for accommodating and/or guiding rolling bodies. As a result, the rolling bodies are guided, for example, in a defined manner in or on the outer ring raceway. Furthermore, the axial and radial force absorption of the rolling bearing can also be influenced by the geometric design of the profiled outer ring raceways.

Depending on the type of rolling bearing, the rolling bodies have the shape of a ball or a roller. They roll on the raceways of the rolling bearing and have the task of transmitting the force acting on a radial rolling bearing from the outer ring to the inner ring and vice versa. In an axial rolling bearing, the rolling bodies transmit the forces acting on the axial rolling bearing between the running discs. Roller-like rolling bodies are also referred to as roller rolling bodies and spherical rolling bodies as bearing balls.

Roller-like rolling bodies can be selected, for example, from the group of symmetrical spherical rollers, asymmetrical spherical rollers, cylindrical rollers, needle rollers and/or tapered rollers.

Rolling bodies can be guided and spaced apart in a cage or by rolling element spacers. In principle, it is also conceivable to design a rolling bearing without a cage, which is also referred to as a full-complement rolling bearing. In full-complement rolling bearings, adjacent rolling bodies can contact one another.

A rolling bearing can have a cage, wherein the cage guides the rolling bodies. The cage is designed in such a way that the rolling element balls and/or the rolling element rollers are spaced apart from one another so that, for example, the friction and heat development of the rolling bodies is kept as low as possible. Furthermore, the cage keeps the rolling element balls and/or rolling element rollers at a fixed distance from one another during rolling, as a result of which an even load distribution can be achieved. The cage can be made in one piece or in multiple pieces.

A spring element can, in particular, be selected from the group of disc springs, helical springs, membrane springs or rubber springs.

In connection with the present disclosure, it is particularly preferred to design a spring element as a disc spring, very particularly preferably as a multi-layer disc spring.

According to an advantageous embodiment of the disclosure, the outer ring of the prestressed rolling bearing can have an outer ring diameter and the spring element can have a spring outer diameter, wherein the spring outer diameter is larger than the outer ring diameter of the rolling bearing and the second bearing seat has a first undercut in the region of the spring element, the undercut diameter of which is larger than the outer ring diameter, so that the spring element is captively accommodated in the first undercut and the prestressed rolling bearing projects in the axial direction into the region of the first undercut, and/or the inner ring of the prestressed rolling bearing can have an inner ring diameter and the spring element can have a spring inner diameter, wherein the spring inner diameter is smaller than the inner ring diameter of the rolling bearing and the first bearing seat has a second undercut in the region of the spring element, the undercut diameter of which is smaller than the inner ring diameter, so that the spring element is captively accommodated in the second undercut and the prestressed rolling bearing projects in the axial direction into the region of the second undercut.

The advantage of this embodiment lies in the fact that the spring element can be secured in the axial direction on the first or second bearing seat in a form-fitting manner, which is favorable in terms of production technology and is functionally reliable.

According to a further preferred further development of the disclosure, the spring element can be formed of multiple layers. It can hereby be achieved that the bearing prestress can be set particularly precisely and for a long period of time.

Furthermore, according to a likewise advantageous embodiment of the disclosure, the second bearing seat can be formed in the motor housing. According to an embodiment of the disclosure alternative to this, the second bearing seat can be formed in a bearing sleeve, which is arranged in the motor housing in a rotationally fixed manner.

Furthermore, the disclosure can also be further developed such that the bearing sleeve has a radially extending sleeve section on which the spring element is supported, whereby the axial spring force is not supported on the motor housing but solely on the bearing sleeve. The bearing sleeve is advantageously formed from a metallic material. The material of the bearing sleeve particularly preferably has a higher strength than the material of the motor housing. Furthermore, the bearing sleeve is preferably fixed in the motor housing by means of a press fit.

In a likewise preferred embodiment variant of the disclosure, the spring element can lie against the outer ring. As a result, the largest possible diameter of the spring element can be selected, which favors the generation of an axial spring force that is as high as possible and also precisely adjusted.

The object of the disclosure is also achieved by a method for producing an electric machine, in particular for use within a powertrain of a hybrid or fully electrically driven motor vehicle, comprising a stator and a rotor which is separated from the stator by an air gap, wherein said stator and rotor can be accommodated in a motor housing, wherein the rotor is rotatably mounted relative to the stator by means of two axially spaced rolling bearings and at least one of the rolling bearings can be axially prestressed by a spring element, which can be supported against the motor housing in the axial direction and can lie against one of the rolling bearings, wherein the rolling bearing to be prestressed has an inner ring and an outer ring, between which a plurality of rolling bodies are accommodated in a rollable manner, and the inner ring can be connected in a rotationally fixed manner to the rotor via a first bearing seat and the outer ring can be connected in a rotationally fixed manner to the motor housing via a second bearing seat, and the outer ring of the rolling bearing to be prestressed has an outer ring diameter and the spring element has a spring outer diameter, wherein the spring outer diameter is larger than the outer ring diameter of the rolling bearing and/or the inner ring of the rolling bearing to be prestressed has an inner ring diameter and the spring element has a spring inner diameter, wherein the spring inner diameter is smaller than the inner ring diameter of the rolling bearing, comprising the following steps:

a1) production of a first undercut on the second bearing seat, the undercut diameter of which is larger than the outer ring diameter, a2) axial insertion of the spring element into the first undercut, in particular by means of an assembly cone, so that the spring element is captively accommodated in the first undercut in a form-fitting manner.

a3) axial insertion of the rolling bearing to be prestressed into the second bearing seat until the rolling bearing to be prestressed projects in the axial direction into the region of the first undercut, so that the rolling bearing lies axially prestressed against the spring element and/or b1) production of a second undercut on the first bearing seat, the undercut diameter of which is smaller than the inner ring diameter, b2) axial insertion of the spring element into the second undercut, in particular by means of an assembly cone, so that the spring element is captively accommodated in the second undercut in a form-fitting manner, b3) axial insertion of the rolling bearing to be prestressed into the first bearing seat until the rolling bearing to be prestressed projects in the axial direction into the region of the second undercut, so that the rolling bearing lies axially prestressed against the spring element.

According to a further preferred embodiment of the subject matter of the disclosure, the method steps a2 and b2 as well as a3 and b3 can be carried out simultaneously.

Finally, the object of the disclosure is also achieved by an electrically operable powertrain of a motor vehicle, comprising an electric machine and a transmission arrangement, wherein the electric machine and the transmission arrangement form a structural unit, wherein the electric machine is designed according to one of claims 1-7.

An electric final powertrain of a motor vehicle comprises an electric machine and a transmission, wherein the electric machine and the transmission form a structural unit.

Provision can in particular be made for the electric machine and the transmission to be arranged in a common powertrain housing. Alternatively, it would of course also be possible for the electric machine to have a motor housing and the transmission to have a transmission housing, in which case the structural unit can then be effected by fixing the transmission in relation to the electric machine.

This structural unit is sometimes also referred to as an E-axle.

The transmission of the electric final powertrain can, in particular, be coupled to the electric machine, which is designed to generate a drive torque for the motor vehicle. The drive torque is particularly preferably a main drive torque, so that the motor vehicle is driven exclusively by the drive torque.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
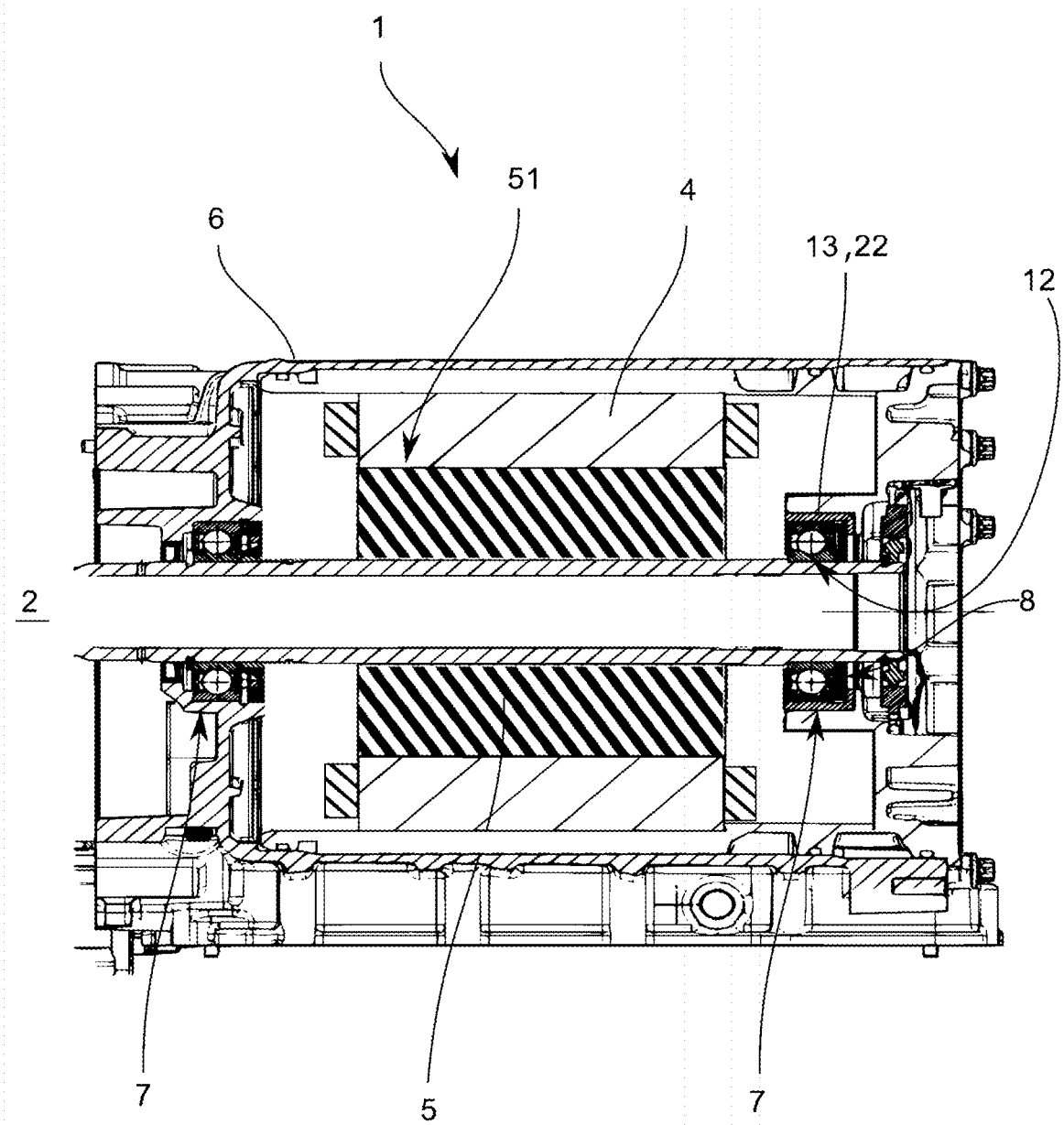
FIG. 1 shows an electric machine according to the disclosure in an axial sectional view.
Figure 4:
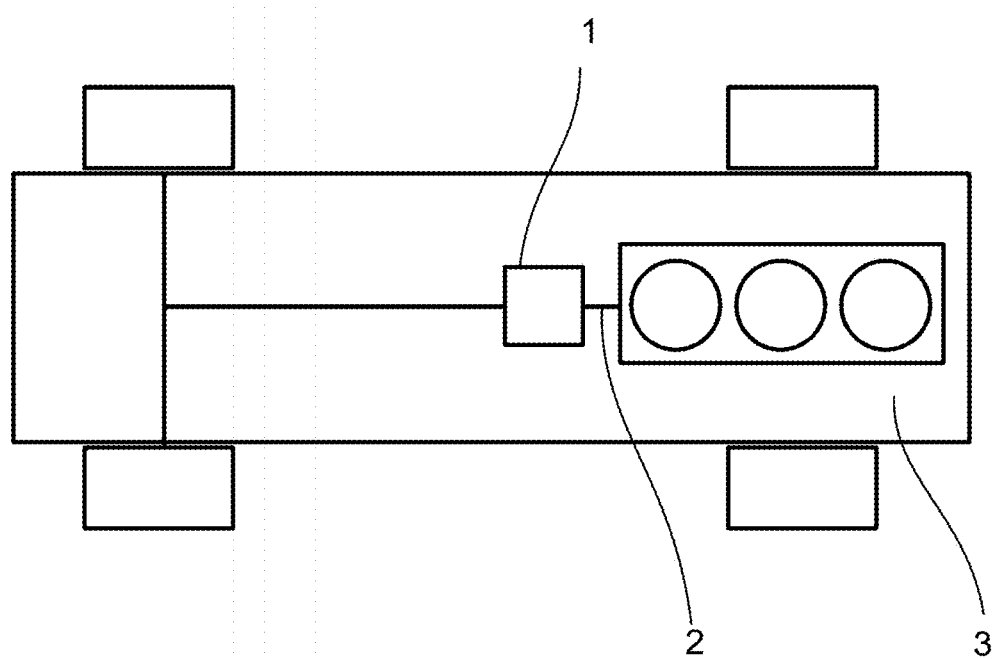
FIG. 4 shows a motor vehicle with an electric machine in a block diagram.
Figure 4:
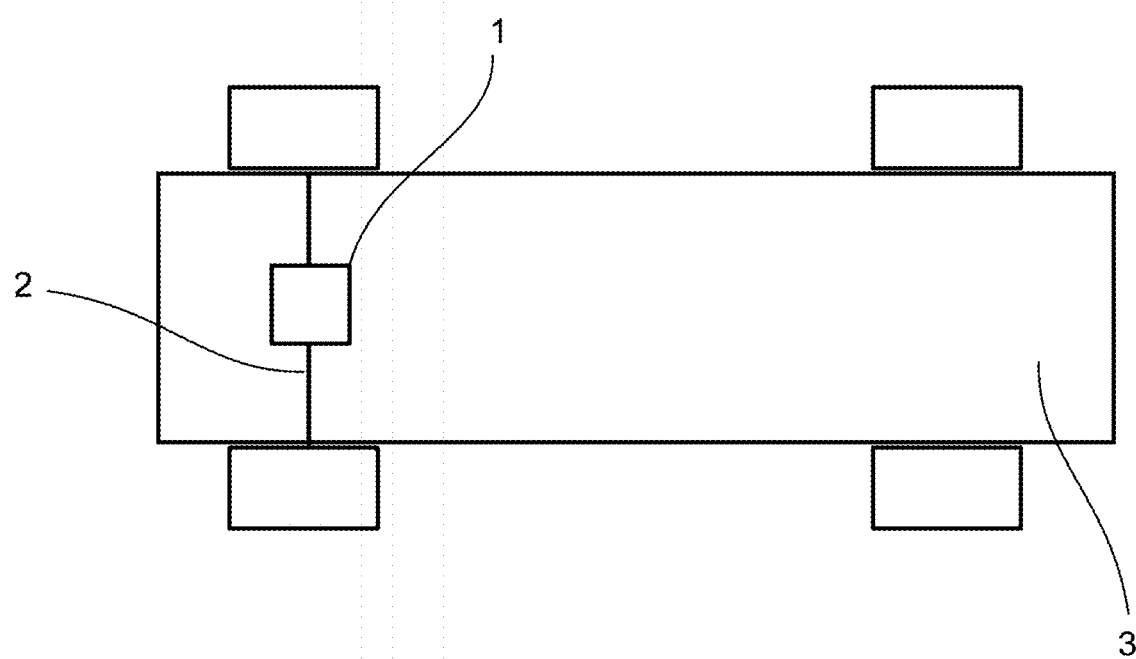

FIG. 1 shows an electric machine 1 for use within a powertrain 2 of a hybrid or fully electrically driven motor vehicle 3, as shown in FIG. 4 by way of example.

The electric machine 1 comprises a stator 4 and a rotor 5 which is separated from the stator 4 by an air gap 51 and which are accommodated in a motor housing 6. The rotor 5 is rotatably mounted relative to the stator 4 by means of two axially spaced rolling bearings 7. One of the rolling bearings 7 is axially prestressed by a spring element 8. In the embodiment of FIG. 1, this is the right rolling bearing 7. The annular spring element 8 is supported against the motor housing 6 in the axial direction and lies against the rolling bearing 7. In the exemplary embodiments shown, the spring element 8 is formed of multiple layers, for example as a multi-layer disc spring or blade spring. Of course, the spring element 8 can also be formed as a spiral spring or as a rubber-elastic element.

The prestressed rolling bearing 7 has an inner ring 9 and an outer ring 10, between which a plurality of rolling bodies 11 are accommodated in a rollable manner. The inner ring 9 is connected in a rotationally fixed manner to the rotor 5 via a first bearing seat 12 and the outer ring 10 is connected in a rotationally fixed manner to the motor housing 6 via a second bearing seat 13. The rotor 5 comprises a rotor body, not described in any more detail, and a rotor 5 designed as a hollow shaft.

The spring element 8 is arranged in a form-fitting, secured manner in the axial direction on the first bearing seat 12 and/or the second bearing seat 13, which will be explained in more detail below.

Figure 2:
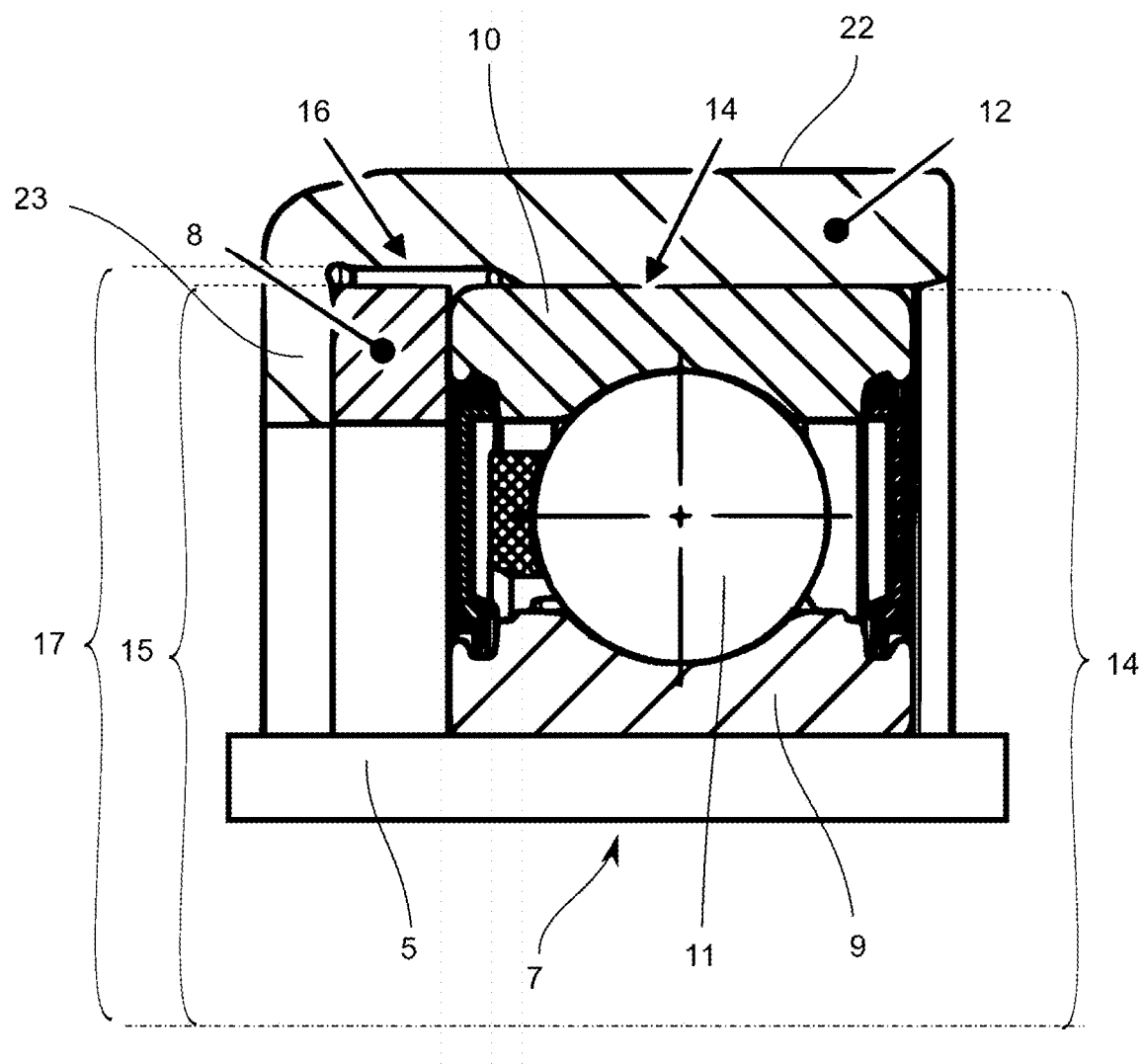
FIG. 2 shows a detailed view of a first bearing seat in an axial sectional view.

FIG. 2 shows a first embodiment of a second bearing seat 13 which is formed in or on a bearing sleeve 22 which is arranged in the motor housing 6 in a rotationally fixed manner. This configuration is also shown in FIG. 1 and shown correspondingly enlarged in the detailed view of FIG. 2. The bearing seat 13 is formed by a press fit of the outer ring 10 with the bearing sleeve 22. The non-rotatable fixing of the bearing sleeve 22 in the motor housing 6 can also be implemented by means of a press fit.

The outer ring 10 of the prestressed rolling bearing 7 has an outer ring diameter 14 and the spring element 8 has a spring outer diameter 15, wherein the spring outer diameter 15 is larger than the outer ring diameter 14 of the rolling bearing 7. The second bearing seat 13 further has a first undercut 16 in the region of the spring element 8 which points radially outwards, the undercut diameter 17 of which is larger than the outer ring diameter 14, so that the spring element 8 is captively accommodated in the first undercut 16. The rolling bearing 7 projects in the axial direction into the region of the first undercut 16, so that the spring element 8 is spring-elastically compressed in the axial direction. In the exemplary embodiment shown, the spring element 8 lies against the outer ring 10.

For the axial support of the spring element 8, the bearing sleeve 22 has a sleeve section 23 running radially inwards, on which the spring element 8 is supported, as shown in FIG. 2.

Figure 3:
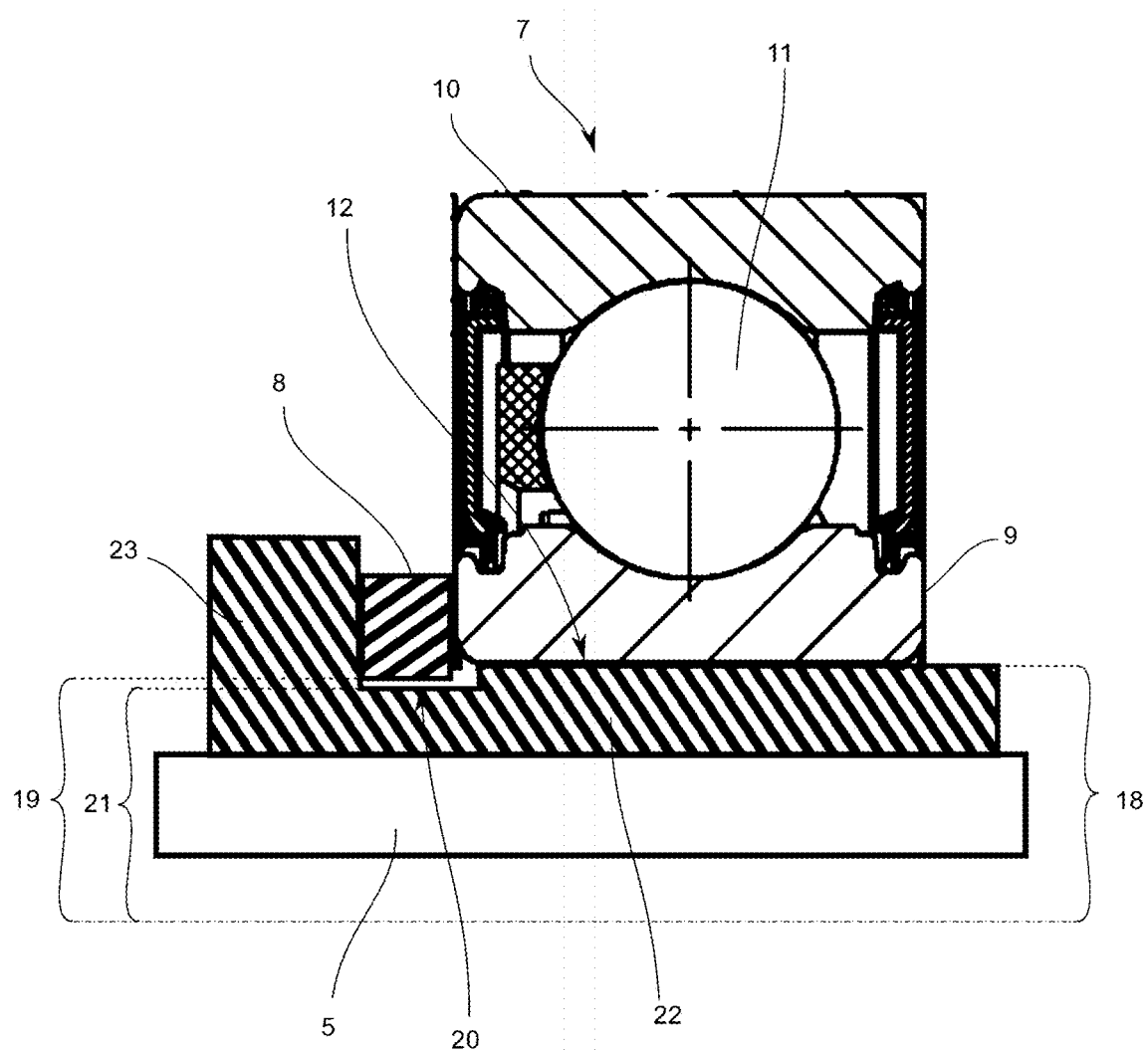
FIG. 3 shows a detailed view of a second bearing seat in an axial sectional view.

In addition or as an alternative to the design of a second bearing seat 13 shown in FIG. 2, a first bearing seat 12 can be present, as represented in FIG. 3.

In this case, the inner ring 9 of the rolling bearing 7 now has an inner ring diameter 18 and the spring element 8 has a spring inner diameter 19, wherein the spring inner diameter 19 is selected to be smaller than the inner ring diameter 18 of the rolling bearing 7. The first bearing seat 12, which is also formed in a bearing sleeve 22, also has a second undercut 20 in the region of the spring element 8, the undercut diameter 21 of which is smaller than the inner ring diameter 18, so that the spring element 8 is captively accommodated in the second undercut 20 and the prestressed rolling bearing 7 projects in the axial direction into the region of the second undercut 20, so that the inner ring 9 is subjected to axial spring force by the spring element 9.

The bearing seat 12 is formed by a press fit of the inner ring 9 with the bearing sleeve 22. The non-rotatable fixing of the bearing sleeve 22 in the rotor 5 can also be implemented by means of a press fit.

Even though the diameters are shown as radii in FIGS. 2-3, it is understood that a doubling of the radius shown results in the diameter in each case.

The electric machine 1 can be manufactured as follows, for example:

a1) production of a first undercut 16 on the second bearing seat 13, the undercut diameter 17 of which is larger than the outer ring diameter 14, a2) axial insertion of the spring element 8 into the first undercut 16, in particular by means of an assembly cone, so that the spring element 8 is captively accommodated in the first undercut 16 in a form-fitting manner.

a3) axial insertion of the rolling bearing 7 to be prestressed into the second bearing seat 13 until the rolling bearing 7 to be prestressed projects in the axial direction into the region of the first undercut 16, so that the rolling bearing 7 lies axially prestressed against the spring element 8 and/or b1) production of a second undercut 20 on the first bearing seat 12, the undercut diameter 21 of which is smaller than the inner ring diameter 18, b2) axial insertion of the spring element 8 into the second undercut 20, in particular by means of an assembly cone, so that the spring element 8 is captively accommodated in the second undercut 20 in a form-fitting manner, b3) axial insertion of the rolling bearing 7 to be prestressed into the first bearing seat 12 until the rolling bearing 7 to be prestressed projects in the axial direction into the region of the second undercut 20, so that the rolling bearing 7 lies axially prestressed against the spring element 8.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electric machine
2 Powertrain
3 Motor vehicle
4 Stator
5 Rotor
51 Air gap
6 Motor housing
7 Rolling bearing
8 Spring element
9 Inner ring
10 Outer ring
11 Rolling bodies
12 Bearing seat
13 Bearing seat
14 Outer ring diameter
15 Spring outer diameter
16 Undercut
17 Undercut diameter
18 Inner ring diameter
19 Spring inner diameter
20 Undercut
21 Undercut diameter
22 Bearing sleeve
23 Sleeve section

The invention claimed is:

1. An electric machine for use within a powertrain of a hybrid or fully electrically driven motor vehicle, comprising: a stator and a rotor which is separated from the stator by an air gap, said stator and rotor being accommodated in a motor housing, wherein the rotor is rotatably mounted relative to the stator with two axially spaced rolling bearings, wherein at least one of the rolling bearings is axially prestressed by a spring element supported against the motor housing in an axial direction and against the at least one prestressed rolling bearing, wherein the at least one prestressed rolling bearing has an inner ring and an outer ring, between which a plurality of rolling bodies are accommodated in a rollable manner, and the inner ring is connected in a rotationally fixed manner to the rotor via a first bearing seat and the outer ring is connected in a rotationally fixed manner to the motor housing via a second bearing seat, wherein the spring element is arranged on the first bearing seat or the second bearing seat so as to be secured in the axial direction in a form-fitting manner, and wherein at least one of:

a) the outer ring of the prestressed rolling bearing has an outer ring diameter and the spring element has a spring outer diameter, wherein the spring outer diameter is larger than the outer ring diameter of the prestressed rolling bearing and the second bearing seat has a first undercut in a region of the spring element having an undercut diameter that is larger than the outer ring diameter, whereby the spring element is captively accommodated in the first undercut and the prestressed rolling bearing projects in the axial direction into a region of the first undercut, or b) the inner ring of the prestressed rolling bearing has an inner ring diameter and the spring element has a spring inner diameter, wherein the spring inner diameter is smaller than the inner ring diameter of the prestressed rolling bearing and the first bearing seat has a second undercut in a region of the spring element having an undercut diameter that is smaller than the inner ring diameter, whereby the spring element is captively accommodated in the second undercut and the prestressed rolling bearing projects in the axial direction into a region of the second undercut.

2. The electric machine according to claim 1, wherein the spring element is formed of multiple layers.

3. The electric machine according to claim 1, wherein the second bearing seat is formed in the motor housing.

4. The electric machine according to claim 1, wherein the second bearing seat is formed in a bearing sleeve which is arranged in the motor housing in a rotationally fixed manner.

5. The electric machine according to claim 4, wherein the bearing sleeve has a radially extending sleeve section on which the spring element is supported.

6. The electric machine according to claim 1, wherein the spring element lies against the outer ring.

7. A method for producing an electric machine for use within a powertrain of a hybrid or fully electrically driven motor vehicle, the method comprising the steps of:

providing a stator and a rotor which is separated from the stator by an air gap, wherein said stator and rotor can be accommodated in a motor housing, wherein the rotor is rotatably mounted relative to the stator with two axially spaced rolling bearings and at least one of the rolling bearings is axially prestressed by a spring element supported against the motor housing in the axial direction, wherein the prestressed rolling bearing has an inner ring and an outer ring, between which a plurality of rolling bodies are accommodated in a rollable manner, and the inner ring is connected in a rotationally fixed manner to the rotor via a first bearing seat and the outer ring is connected in a rotationally fixed manner to the motor housing via a second bearing seat, and the outer ring of the prestressed rolling bearing has an outer ring diameter and the spring element has a spring outer diameter, wherein the spring outer diameter is larger than the outer ring diameter of the prestressed rolling bearing or the inner ring of the prestressed rolling bearing has an inner ring diameter and the spring element has a spring inner diameter, wherein the spring inner diameter s smaller than the inner ring diameter of the rolling bearing, a1) forming a first undercut on the second bearing seat having an undercut diameter that is larger than the outer ring diameter, a2) axially inserting the spring element into the first undercut with an assembly cone, so that the spring element is captively accommodated in the first undercut in a form-fitting manner, a3) axially inserting the rolling bearing to be prestressed into the second bearing seat until the rolling bearing to be prestressed projects in the axial direction into the region of the first undercut, so that the rolling bearing lies axially prestressed against the spring element, or b1) forming a second undercut on the first bearing seat having an undercut diameter that is smaller than the inner ring diameter, b2) axially inserting the spring element into the second undercut so that the spring element is captively accommodated in the second undercut in a form-fitting manner, b3) axially inserting the rolling bearing to be prestressed into the first bearing seat until the rolling bearing to be prestressed projects in the axial direction into a region of the second undercut, so that the rolling bearing lies axially prestressed against the spring element.

8. The method according to claim 7, wherein
steps a2 and b2 and a3 and b3 are carried out at the same time.

9. An electrically operable powertrain of a motor vehicle, comprising an electric machine and a transmission arrangement, wherein the electric machine and the transmission arrangement form a structural unit, wherein
the electric machine includes:
    a stator and a rotor which is separated from the stator by an air gap, said stator and rotor being accommodated in a motor housing, wherein the rotor is rotatably mounted relative to the stator with two axially spaced rolling bearings, wherein at least one of the rolling bearings is axially prestressed by a spring element supported against the motor housing in an axial direction and against the at least one prestressed rolling bearing, wherein the at least one prestressed rolling bearing has an inner ring and an outer ring, between which a plurality of rolling bodies are accommodated in a rollable manner, and the inner ring is connected in a rotationally fixed manner to the rotor via a first bearing seat and the outer ring is connected in a rotationally fixed manner to the motor housing via a second bearing seat, wherein the spring element is arranged on the first bearing seat or the second bearing seat so as to be secured in the axial direction in a form-fitting manner, and wherein at least one of:
    a) the outer ring of the prestressed rolling bearing has an outer ring diameter and the spring element has a spring outer diameter, wherein the spring outer diameter is larger than the outer ring diameter of the prestressed rolling bearing and the second bearing seat has a first undercut in a region of the spring element having an undercut diameter that is larger than the outer ring diameter, whereby the spring element is captively accommodated in the first undercut and the prestressed rolling bearing projects in the axial direction into a region of the first undercut, or b) the inner ring of the prestressed rolling bearing has an inner ring diameter and the spring element has a spring inner diameter, wherein the spring inner diameter is smaller than the inner ring diameter of the prestressed rolling bearing and the first bearing seat has a second undercut in a region of the spring element having an undercut diameter that is smaller than the inner ring diameter, whereby the spring element is captively accommodated in the second undercut and the prestressed rolling bearing projects in the axial direction into a region of the second undercut.

10. The electrically operable powertrain according to claim 9, wherein the spring element is formed of multiple layers.

11. The electrically operable powertrain according to claim 9, wherein the second bearing seat is formed in the motor housing.

12. The electrically operable powertrain according to claim 9, wherein the second bearing seat is formed in a bearing sleeve which is arranged in the motor housing in a rotationally fixed manner.

13. The electrically operable powertrain according to claim 12, wherein the bearing sleeve has a radially extending sleeve section on which the spring element is supported.

14. The electrically operable powertrain according to claim 9, wherein the spring element lies against the outer ring.

\* \* \* \* \*